United States Patent [19]

Malsot

[11] 4,208,095

[45] Jun. 17, 1980

[54] CONNECTOR FOR AN OPTICAL MONOFIBRE

[75] Inventor: Christian Malsot, Suresnes, France

[73] Assignee: Socapex, Suresnes, France

[21] Appl. No.: 878,722

[22] Filed: Feb. 17, 1978

[30] Foreign Application Priority Data

Feb. 23, 1977 [FR] France ............... 77 05252

[51] Int. Cl.$^2$ ............................. G02B 5/14
[52] U.S. Cl. ................. 350/96.21; 350/96.22
[58] Field of Search ............ 350/96.20, 96.21, 96.22

[56] References Cited

U.S. PATENT DOCUMENTS

| 3,798,099 | 3/1974 | Marcatili | 350/96.21 X |
| 4,030,809 | 6/1977 | Onishi et al. | 350/96.21 |
| 4,103,987 | 8/1978 | Kersten | 350/96.21 |

FOREIGN PATENT DOCUMENTS

| 969744 | 6/1975 | Canada | 350/96.21 |
| 2527008 | 1/1977 | Fed. Rep. of Germany | 350/96.21 |

OTHER PUBLICATIONS

Dabby, "Permanent Multiple Splices of Fused-Silica Fibers", *Bell Syst. Tech. Journal*, vol. 54, No. 2, Feb. 1975, pp. 451-455.
"Connector from AEG-Telefunken Aligns Ends of Optical Fibers Automatically", *Electronics*, Nov. 11, 1976, pp. 8E-13E.

*Primary Examiner*—John K. Corbin
*Assistant Examiner*—John D. Lee
*Attorney, Agent, or Firm*—Cushman, Darby & Cushman

[57] ABSTRACT

A connector for two optical monofibres, with two ferrules, each ferrule comprising a positioning sleeve and a beam, joining in bridge-fashion with two sleeves, and bearing a V-shaped groove for receiving the two fibres to be connected, therefore positioned opposite one another in unique fashion irrespective of the precision with which the angle of the V-shaped groove is machined.

3 Claims, 4 Drawing Figures

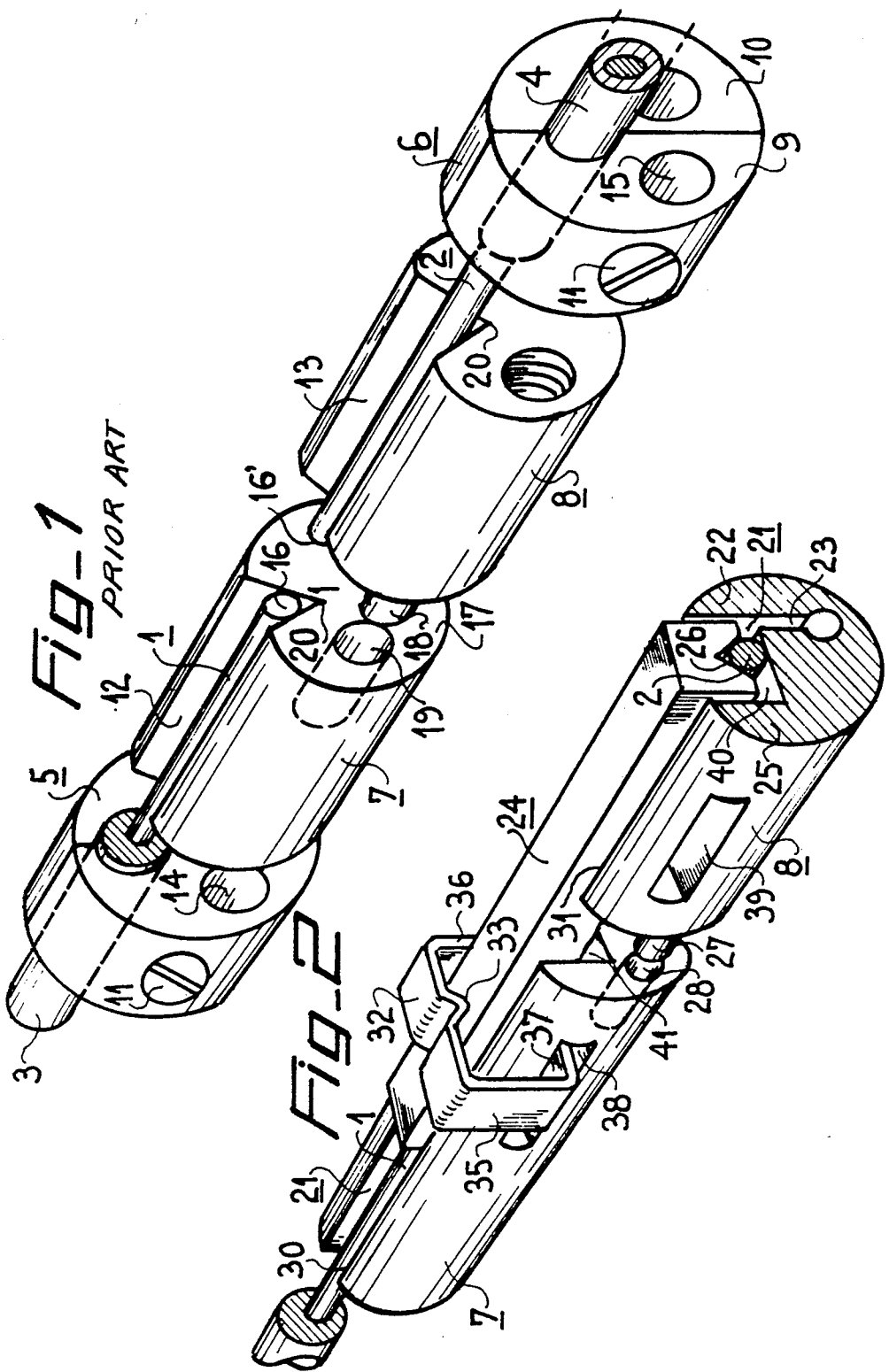

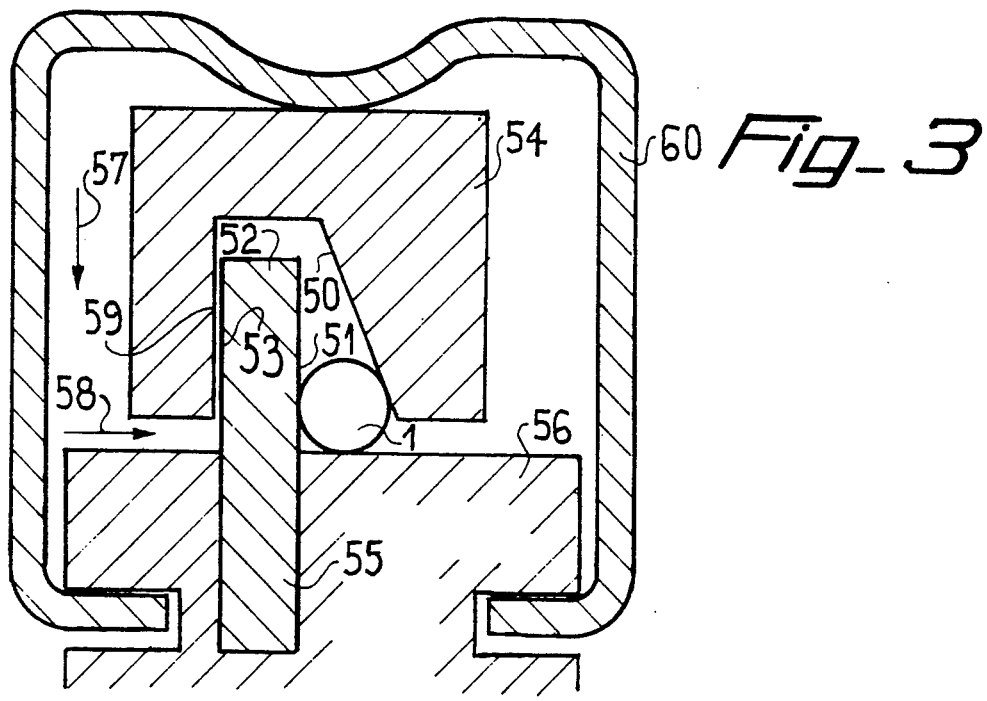
Fig_3
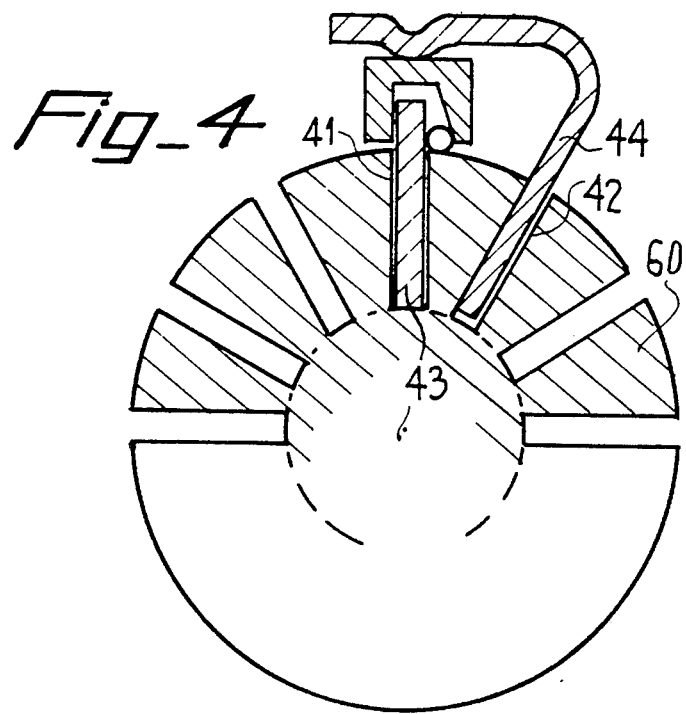
Fig_4

CONNECTOR FOR AN OPTICAL MONOFIBRE

This invention relates generally to connectors for optical fibre transmission lines comprising only a single fibre.

In the case of a single-fibre transmission line, the connection between the contact surfaces of two monofibres requires extreme precision in the transverse positioning of the ends of the two monofibres in their respective ferrule on account of the very small dimensions of their cross-sections, typically surfaces defined by circles of the order of 100 micrometers in diameter.

In many cases, the position of the contact surface of a monofibre is defined by means of a positioning sleeve which comprises an open passage extending parallel to its longitudinal axis and opening at its end faces, this passage being delimited by two planes arranged dihedrally in a configuration known in the art as a "Vee".

It is also known that a cylindrical fibre placed in this passageway with its lateral surface forming a tangent to the two sides of the passageway adopts a geometric position defined solely by the angle of the dihedron. It is this result which is utilised in connectors of which the two ferrules to be joined together each comprise a V-form positioning sleeve. By positioning the homologous passageways opposite one another by means of known orienting and centring members, it is possible for the contact surfaces of the homologous monofibres accommodated in the passageways to be placed opposite one another with accuracy. However, as will be explained in detail hereinafter, several requirements which are difficult to satisfy have to be satisfied before a result such as this can be obtained.

The first of these requirements is that the angles of the dihedrons which define the respective passageways present in the sleeves should be identical otherwise, as mentioned above, the position of the contact surfaces of the two monofibres will not be the same after they have been placed opposite one another with the known adverse effects upon the transmission of the luminous signal in the connection plane.

A second requirement is that the angle of the dihedron should be industrially defined with extreme accuracy in accordance with a given standard in order to provide for the interchangeability of a given ferrule with any other without any need for matching. In the production of conventional V-form connectors, this requirement necessitates precise and therefore expensive machining operations in the positioning sleeves.

Finally, it is pointed out that the known solutions with the V-form passageway do not lend themselves to the production of multichannel connectors.

The ferrule for a connector according to the present invention does not have any of these disadvantages.

In principle, it uses a separate member comprising a V-form passageway which is separate from the two positioning sleeves and which is simultaneously rendered integral with them when the connection is being made. It is the fact that the two fibres to be positioned opposite one another rest in a single V-form passageway for the two sleeves which guarantees the absolute equality of the angles of the two portions of passageway respectively occupied by the two fibres.

More precisely, the present invention relates to a connector for an optical monofibre which establishes a connection between two fibres by positioning their respective contact surfaces opposite one another and which is formed by two ferrules provided with connecting means, each ferrule supporting a positioning sleeve, characterised in that it comprises, on the one hand, a rod provided with a V-form passage for simultaneously receiving said two fibres and, on the other hand, means for fixing and defining the geometric position of said rod simultaneously on the lateral surface of the two sleeves.

The invention will be better understood from the following description in conjunction with the accompanying drawings, wherein:

FIG. 1 is a perspective view of a connector belonging to the prior art.

FIG. 2 is a perspective view of one embodiment of a connector according to the invention.

FIG. 3 is a cross-section through another embodiment of the connector according to the invention.

FIG. 4 is a cross-section through a multichannel positioning sleeve joining a plurality of monofibre connectors according to the invention.

FIG. 1 is a perspective view of a monofibre connector belonging to the prior art showing only the essential elements.

This connector, which is designed for connecting monofibres such as 1 and 2 surrounded by protective claddings, such as 3 and 4, consists of two ferrules, of which each comprises in particular a cable clip, such as 5 or 6, and a positioning sleeve, such as 7 or 8. Each cable clip is formed by two jaws 9 and 10 and by means for securing these jaws to the protective cladding of each monofibre, such as a screw 11.

Each sleeve comprises a V-form positioning passage, such as 12 and 13, intended to receive the bare fibres 1 and 2. A connector such as this is used as follows: after they have been stripped over a suitable length, each of the two monofibres 1 and 2 is inserted into the cable clips 5 and 6 which are then secured to the sleeves 7 and 8 by screws introduced into the openings 14 and 15. Each monofibre is then subjected to a translatory movement in the opening of the cable clip to align its front contact surface 16 with the front contact surface 17 of the corresponding positioning sleeve.

The screws 11 are then tightened to immobilise the monofibres. In addition, means for aligning the longitudinal axes of the two sleeves, such as lugs 18 co-operating with recesses 19, ensure the co-linearity of the respective edges 20 of the dihedrons or vees carried by the sleeves.

However, a structure such as this is attended by a serious disadvantage which is that the positioning of the fibres and their respective contact surfaces depends upon the equality of the angles of the vees, as mentioned above. If, for example, one of the vees has a smaller angle than the other, as illustrated in FIG. 1 where the angle of the vee of the sleeve 7 is smaller than that of the sleeve 8, the corresponding fibre 1 will be positioned closer to the external contour of the sleeve 7 than the fibre 2 to the external contour of the sleeve 8, resulting in only a partial overlap of the contact surfaces 16 and 16' with the well-known adverse effects upon transmission. Accordingly, the equality of the angle of one sleeve to another, taking into account the extreme precision required combined with the very small dimensions of the fibres, involves high production costs with the danger that some sleeves to be associated, of which the production tolerances correspond to opposing extreme values, will have to be separated for subsequent prolonged and expensive matching.

FIG. 2 shows one embodiment of a connector for an optical monofibre according to the present invention. In the interests of clarity, some elements similar to those of the known connector shown in FIG. 1, such as the cable clips, have not been shown in FIG. 2.

According to the invention, each sleeve comprises a groove 21 of rectangular cross-section, of which one wall 22 is made flexible by means of a slot 23.

This groove is designed to receive a common rod 24 of rectangular cross-section adapted to the cross-section of the groove where it is able to penetrate with a certain elastic holding effect attributable to the flexible wall 22.

Accordingly, the transverse position of the rod is perfectly defined by contact with the fixed lateral surface 25 of the groove which thus represents a reference surface for the geometric position of the rod.

The rod 24 has a length such that it extends simultaneously over the two sleeves 7 and 8 in the manner of a bridge.

On one of its lateral surfaces, it has a V-form passageway 26 which is therefore common to the two sleeves.

A connector of the type in question is used as follows:

The two sleeves 7 and 8 are placed opposite one another and are transversely aligned by the penetration of lugs, such as 27, into recesses, such as 28. The two optical fibres 1 and 2 are placed in the grooves 30 and 31 and their contact surfaces are aligned with those of the jaws by the play of the cable clips, as in the case of the connector shown in FIG. 1.

The common rod 24 is then placed in the grooves with its surface carrying the longitudinal vee turned towards the base of the grooves. The vee exerts its transverse positioning effect and the required result is obtained. The bearing force on the fibres should be such that it is sufficient to align their contact surfaces without crushing or damaging the fibres themselves.

In order to satisfy this requirement, use is made of a bearing force exerted by an elastic means, such as yokes made of an elastic material, such as 32, in the form of a horseshoe of which the central part has a profile 33 resting on the rod, whilst the lateral arms 35 and 36 comprise two hooks, such as 37, engaging in recesses, such as 38 and 39, formed in the sleeves.

The two fibres 1 and 2 are therefore accurately positioned with their contact surfaces opposite one another by the effect due to the common vee, to the lateral surfaces of which they are applied by the pressure exerted on them by the inner surface 40 of the groove.

It is pointed out that, to enable this pressure to be applied, it is necessary in the embodiment described for the fibre itself to rest on the inner surface 40 of the groove and, hence, for the depth of the V-form passage in relation to the surface of the rod in which it is formed to be below a value associated with the diameter of the fibre.

It is also pointed out that the precision with which the rectangular grooves formed in the sleeves are machined does not have to be any higher than it is at the present time because the accuracy of positioning is laterally ensured by a single vee, and that it is only the two respective inner surfaces 40 and 41 of the grooves which have to be aligned. This requirement is readily satisfied by known industrial techniques, of which alignment by lug and groove is but one example.

Finally, it is pointed out that the main parts of the ferrules of the connector according to the invention are thus inexpensive to produce and do not require any matching in service. Accordingly, the interconnection of a given line with any other line may be immediately established without any need for dismantling on site or for laboratory work.

FIG. 3 shows a modified embodiment of the monofibre connector according to the invention.

In this variant, some of the constituent elements advantageously perform several of the functions performed by separate elements in the connector shown in FIG. 2.

In the connector shown in FIG. 2, the rectangular groove is responsible in particular for the lateral positioning of the rod by its lateral surfaces, of which one exerts a lateral force by an elastic means. In the case of FIG. 3, these functions are performed by elements already performing other functions.

To this end, the surfaces of the dihedron forming the centring vee are respectively formed for one by one of the surfaces 50 of the passage of the rod, as described above, but for the other by one surface 51 carried by a wall 52 integral with the sleeve, of which the other surface 53 performs the function of guiding the rod 54 under conditions similar to the lateral reference surface of the groove 40 in FIG. 2.

In one particularly advantageous simplification of the invention, this wall may be formed by a single plate extending longitudinally over each sleeve and engaging in a slot 55 sufficiently deep to ensure a firm mechanical hold on the sleeve. Although each sleeve carries a separate plate, one particularly interesting variant consists in using a single plate which connects the two sleeves in the manner of a bridge and which at the same time performs one of the lateral centring functions performed by the lug and groove system in FIGS. 1 and 2. This plate may be economically produced by rolling from a hard metallic material, such as phosphor bronze or steel, and may assume the form of a flexible plate.

The function of applying an elastic bearing force to a reference surface is performed by the fibre itself. This is because the pressure required for centring the fibre in the dihedron, of which the direction and the sense are perpendicular to the surface of the sleeve 56, as indicated by the arrow 57, creates a component 58 parallel to that direction which simultaneously applies the surface 59 to the outer surface 53 of the plate 52. The assembly is held together by an elastic yoke 60 which has the same structure and performs the same function as that shown in FIG. 2. Accordingly, the sleeve 56 lends itself to uncomplicated machining and positioning of the fibre because its useful surface is largely free and even completely free where the plate 52 is separate.

FIG. 4 shows an application of the invention in the case of a multichannel connector. The ferrule of this connector is cylindrical in its overall geometry and the positioning sleeve 60 shown comprises 6 channels. It is formed by a cylinder in which longitudinal recesses or grooves, in this case 12 in number, have been formed. In two adjacent grooves, such as 41 and 42, there are respectively accommodated a plate 43 and an elastic fixing square 44 of which the respective functions are the same as those performed by the plate and the yoke in FIG. 3, the results obtained being similar. The multichannel connector constructed in accordance with the invention is thus particularly simple and inexpensive in terms of production, structure and use.

It should be understood that the embodiments described and illustrated above have been given purely by way of example and that any connector structure for an optical fibre comprising a fibre-positioning member provided with a V-form passage and arranged bridge-fashion over the two ferrules of the connector falls within the scope of the present invention. In particular, the orientation of the V-form passage described as being directed towards the axis of the positioning sleeve, thus determining a closed passage in which the fibre is secured, may be selected in the direction opposite to that axis, terminating in an open passage on the outer surface of the sleeve.

On the other hand, this orientation gives rise to the need to fix the optical fibre in the V-form passage by additional means in contrast to the orientation described and illustrated above where the fibre is simultaneously positioned and held by the same means, which represents one of the advantages of the corresponding embodiment.

What is claimed:

1. A coupler for detachably joining the ends of a pair of optical fibers comprising:
    a pair of positioning sleeves, each having surfaces defining a flexible groove;
    means for coaxially aligning said sleeves;
    a rod having a longitudinal V-form notch therein for at least partially receiving said pair of optical fibers in substantially coaxial alignment, said rod positioned such that said notch receiving said optical fibers faces said surfaces of said positioning sleeves and said rod having a width substantially equal to the unflexed width of said groove to fit securely within said groove;
    means for holding said rod securely against said optical fibers and for holding said optical fibers against said groove surfaces and said V-form notch of said rod so as to maintain coaxial alignment between said fibers.

2. A coupler for detachably joining the ends of a pair of optical fibers comprising:
    a pair of positioning sleeves, each having an optical fiber contact surface,
    means for coaxially aligning said sleeves,
    a rod having a longitudinal V-form notch therein for at least partially receiving said pair of optical fibers in substantially coaxial alignment, said rod positioned such that said notch receiving said optical fibers faces said optical fiber surfaces of said positioning sleeves and
    a plate inserted into said notch,
    said optical fibers being held in contact with said plate, within said V-form notch, and against said optical fiber contact surface and said V-form notch simultaneously so as to maintain coaxial alignment between said fibers.

3. A coupler for detachably joining the ends of a plurality of pairs of optical fibers comprising:
    a pair of positioning sleeves each having a plurality of radial grooves therein and having a plurality of optical fiber contact surfaces;
    means for coaxially aligning said sleeves such that corresponding radial grooves are in substantial alignment with one another;
    a plurality of plates, one each insertable into each such grooves;
    a plurality of rods, one for each such pair of optical fibers to be joined, each rod having a V-form notch therein for receiving a pair of optical fibers in substantial coaxial alignment, each of said rods positioned to receive one plate within its V-form notch and to hold an optical fiber at least partially within said notch; and
    means for forcing said rods against said optical fibers and plates such that each optical fiber is held securely in contact with a surface of a plate, a surface of a V-form notch and an optical fiber contact surface.

* * * * *